US009163299B2

(12) United States Patent
Boulos et al.

(10) Patent No.: US 9,163,299 B2
(45) Date of Patent: Oct. 20, 2015

(54) DEVICE FOR PRODUCING TITANIUM METAL, AND METHOD FOR PRODUCING TITANIUM METAL

(75) Inventors: Maher I. Boulos, Sherbrooke (CA); Jiayin Guo, Sherbrooke (CA); Jerzy Jurewicz, Sherbrooke (CA); Gang Han, Yasugi (JP); Shujiroh Uesaka, Yasugi (JP); Tatsuya Shoji, Yasugi (JP)

(73) Assignees: HITACHI METALS, LTD., Tokyo (JP); TEKNA PLASMA SYSTEMS INC., Quebec (CA)

( * ) Notice: Subject to any disclaimer, the term of this patent is extended or adjusted under 35 U.S.C. 154(b) by 231 days.

(21) Appl. No.: 13/988,580

(22) PCT Filed: Nov. 17, 2011

(86) PCT No.: PCT/JP2011/076506
§ 371 (c)(1),
(2), (4) Date: Jun. 18, 2013

(87) PCT Pub. No.: WO2012/070461
PCT Pub. Date: May 31, 2012

(65) Prior Publication Data
US 2013/0255445 A1 Oct. 3, 2013

(30) Foreign Application Priority Data

Nov. 22, 2010 (JP) .................. 2010-260108

(51) Int. Cl.
C22B 34/12 (2006.01)
F27D 11/08 (2006.01)
F27D 11/06 (2006.01)

(52) U.S. Cl.
CPC ........... *C22B 34/129* (2013.01); *C22B 34/1272* (2013.01); *F27D 11/06* (2013.01); *F27D 11/08* (2013.01)

(58) Field of Classification Search
CPC ................ C22B 34/1272; F27D 11/08; F27D 2099/0031
See application file for complete search history.

(56) References Cited

U.S. PATENT DOCUMENTS 2,997,385 A 8/1961 Winter, Jr.
3,615,202 A * 10/1971 Stern et al. .................... 423/613
(Continued)

FOREIGN PATENT DOCUMENTS

JP 33-003004 B1 4/1958
JP 2009-242946 A 10/2009
(Continued)

OTHER PUBLICATIONS

D.A. Hansen, et al., "Producing Titanium Powder by Continuous Vapor-Phase Reduction", JOM, 1998, pp. 56-58, No. 11.
(Continued)

*Primary Examiner* — George Wyszomierski
*Assistant Examiner* — Tima M McGuthry Banks
(74) *Attorney, Agent, or Firm* — Sughrue Mion, PLLC

(57) ABSTRACT

A device for producing titanium metal comprises (a) a first heating unit that heats and gasifies magnesium and a first channel that feeds the gaseous magnesium, (b) a second heating unit that heats and gasifies titanium tetrachloride so as to have a temperature of at least 1600° C. and a second channel that feeds the gaseous titanium tetrachloride, (c) a venturi section at which the second channel communicates with an entrance channel, the first channel merges into a throat and as a result the magnesium and the titanium tetrachloride combine in the throat and a mixed gas is formed in the exit channel, and in which the temperature of the throat and the exit channel is regulated to be at least 1600° C., (d) a titanium metal deposition unit that communicates with the exit channel and has a substrate for deposition with a temperature in the range of 715-1500° C., and (e) a mixed gas discharge channel that communicates with the titanium metal deposition unit.

10 Claims, 4 Drawing Sheets

(56) References Cited

U.S. PATENT DOCUMENTS

2008/0173131 A1* 7/2008 Withers et al. .................. 75/370
2009/0260481 A1* 10/2009 Boulos et al. ................ 75/10.19

FOREIGN PATENT DOCUMENTS

| JP | 2011-231402 A | 11/2011 |
| WO | 2010/137688 A1 | 12/2010 |
| WO | 2011/125402 A1 | 10/2011 |

OTHER PUBLICATIONS

International Search Report of PCT/JP2011/076506, dated Feb. 7, 2012.

* cited by examiner

DEVICE FOR PRODUCING TITANIUM METAL, AND METHOD FOR PRODUCING TITANIUM METAL

CROSS REFERENCE TO RELATED APPLICATIONS

This application is a National Stage of International Application No. PCT/JP2011/076506 filed Nov. 17, 2011 (claiming priority based on Japanese Patent Application No. 2010-260108 filed Nov. 22, 2010), the contents of which are incorporated herein by reference in their entirety.

TECHNICAL FIELD

The present invention generally relates to an apparatus and a process for producing titanium metal. More specifically, the invention relates to an apparatus and a process for producing titanium metal by making titanium metal deposited and grown from a mixed gas of titanium tetrachloride and magnesium.

BACKGROUND ART

Titanium is a light metal having a high mechanical strength to weight ratio and exhibiting superior corrosion resistance. Titanium is widely used in various fields including airplane, medical and automobile industries. A quantity of consumed titanium use has been increasing. Titanium is the fourth most abundant element in the earth's crust after aluminum, iron, and magnesium among metal elements and thus is a plentiful resource. Although titanium is a plentiful resource, titanium is up against short supply and has been at least an order of magnitude more expensive than steel materials.

Titanium metal has been mainly produced by a Kroll Process. In the Kroll Process, titanium ore containing titanium dioxide ($TiO_2$) as a main component is reacted with a chlorine gas and coke (C) to produce titanium tetrachloride ($TiCl_4$). Subsequently, highly-purified titanium tetrachloride is produced through distillation and separation. Titanium metal is produced through thermal reduction of the purified titanium tetrachloride with magnesium (Mg). In the thermal reduction step of the Kroll Process, a reduction reaction vessel made of a stainless steel is filled with a magnesium melt at a temperature of not lower than 800° C. Titanium tetrachloride in a liquid phase is dropped into the vessel from above and reacts with the magnesium melt in the vessel to produce titanium. The produced titanium sinks in the magnesium melt and thus titanium is produced in a sponge form. By-product magnesium chloride and unreacted magnesium in the liquid phase are mixed in the titanium in the sponge form. Upon completion of the reaction, the reaction mixture is subjected to a vacuum separation process at a high temperature of not lower than 1000° C. to obtain a sponge cake of porous titanium. The sponge cake is cut and crushed to produce sponge titanium.

The Kroll Process can effectively produce a titanium material for practical use. However, a long production time is required since the thermal reduction process and the separation process are conducted separately. The production is less efficient since it is a batch process. Accordingly, various techniques have been suggested to overcome the problems of the Kroll Process.

For example, Patent Literature 1 (JP-B-33-3004) discloses a process including steps of supplying a titanium tetrachloride gas and magnesium vapor in a reaction vessel to cause a gas-phase reaction at a temperature of 800 to 1100° C. and under a vacuumed atmosphere of $10^{-4}$ mmHg ($1.3 \times 10^{-2}$ Pa) in the vessel, and depositing titanium on a net-like collection material disposed in the vessel to collect titanium.

Patent Literature 2 (U.S. Pat. No. 2,997,385) discloses a process for producing a metal, including steps of introducing halide vapor as a metal element and alkali metal or alkaline earth metal vapor as a reducing agent into a reaction vessel, and causing a gas-phase reaction in the vessel in an evacuated atmosphere under a pressure of 0.01 to 300 mmHg (1.3 Pa to 40 kPa) and at a temperature of 750 to 1200° C. Patent Literature 2 discloses, in Example II, a method for producing titanium from $TiCl_4$ gas and Mg gas, and specifically, the reaction was caused at a reaction temperature of approximately 850° C. and under a pressure of 10 to 200 microns (1.3 to 26.7 Pa).

Non Patent Literature 1 (D. A. Hansen and S. J. Gerdemann, JOM, 1998, No. 11, page 56) discloses a process for producing titanium ultrafine powders through a gas-phase reaction. According to the process, titanium tetrachloride gas and magnesium gas are introduced into a reaction vessel and reacted at a temperature of not lower than 850° C., and produced titanium ultrafine powders and concomitantly produced $MgCl_2$ powders are separated in a cyclone at a lower portion. Then, magnesium and $MgCl_2$ are separated from the obtained titanium ultrafine powders through vacuum distillation or filtration.

Patent Literature 1: JP-B-33-3004
Patent Literature 2: U.S. Pat. No. 2,997,385
Patent Literature 3: JP-A-2009-242946
Non Patent Literature 1: D. A. Hansen and S. J. Gerdemann, JOM, 1998, No. 11, page 56

SUMMARY OF INVENTION

According to searches by the present inventors, a small amount of titanium can be collected by the process disclosed in Patent Literature 1. However, supply rate of reactants is limited in order to maintain a pressure in a reaction vessel to $10^{-4}$ mmHg. Production capacity may be increased by increasing a size of a vacuum pump and exhaust capability. However, it is difficult to obtain a large amount of titanium metal for industrial use.

By the process disclosed in Patent Literature 2, purified titanium can be collected as well as by the process disclosed in Patent Literature 1. However, a production rate is low at a low-pressure.

Powder produced by the process disclosed in Non Patent Literature 1 has an approximately submicron size and thus magnesium and $MgCl_2$ can not be efficiently separated from the powder. Accordingly, an amount of impurities are contained. Thus, the process requires an independent means for separation, such as vacuum distillation.

As described above, the literatures suggest processes for producing titanium through a gas-phase reaction of titanium tetrachloride gas with magnesium gas in order to overcome the problems of the Kroll Process. However, it is essentially required to separate by-product $MgCl_2$ or unreacted magnesium in a highly evacuated state according to these processes, and thus it is difficult to obtain a large amount of titanium.

The inventors have proposed a process and an apparatus for depositing titanium metal by supplying titanium tetrachloride and magnesium into RF thermal plasma flame. The titanium tetrachloride and magnesium evaporate in the RF thermal plasma flame and titanium tetrachloride is reduced by magnesium, thereby reduced titanium metal is deposited (JP-A-2009-242946).

According to the process, uniform mixing of titanium tetrachloride gas and magnesium gas is essential for efficient reaction between the gases.

An object of the present invention is to provide a process and an apparatus for effectively producing titanium metal from titanium tetrachloride and magnesium as starting materials by promoting uniform mixing of the titanium tetrachloride gas and the magnesium gas.

An apparatus for producing titanium metal according to the present invention includes:

(a) a first heating unit for heating and gasifying a first material selected from magnesium and titanium tetrachloride, and a first channel for supplying the gaseous first material from the first heating unit;

(b) a second heating unit for heating and gasifying a second material selected from magnesium and titanium tetrachloride at a temperature of not lower than 1600° C., and a second channel for supplying the gaseous second material from the second heating unit;

(c) a venturi section including an entrance channel, an exit channel, and a throat having a smaller cross-sectional area between the entrance channel and the exit channel, wherein the second channel is connected to the entrance channel and the first channel merges with the throat so that magnesium and titanium tetrachloride flowing through the first channel and the second channel merge in the throat and the merged gaseous magnesium and titanium tetrachloride are mixed in the exit channel, and wherein a temperature of the throat and the exit channel is controlled at not lower than 1600° C.;

(d) a titanium metal deposition unit in communication with the exit channel, the titanium metal deposition unit having a deposition substrate for depositing the titanium metal at a temperature from 715 to 1500° C.; and (e) a discharge unit for the mixed gas in communication with the titanium metal deposition unit.

According to a preferred embodiment, the first material is magnesium and the second material is titanium tetrachloride, and the second heating unit includes a plasma torch and a titanium tetrachloride supply section, thereby titanium tetrachloride is supplied from the titanium tetrachloride supply section and injected into a plasma flame produced by the plasma torch and heated at not lower than 1600° C.

Alternatively, the first material is titanium tetrachloride and the second material is magnesium, and the second heating unit includes a plasma torch and a magnesium supply section, thereby magnesium is supplied from the magnesium supply section and injected into a plasma flame produced by the plasma torch and heated at not lower than 1600° C.

The plasma torch may include any plasma generation mechanism. It may, for example, include a DC plasma torch. Plasma can instantly heat the titanium tetrachloride (or magnesium) into a gas at a temperature of not lower than 1600° C. In addition, an electrical power for the plasma can be controlled for allowing a plasma flame to reach the venturi section in order to control the temperature of the mixed gas. Mixing of titanium tetrachloride and magnesium in thermal plasma is suitable for a reduction reaction and deposition.

An absolute pressure in the titanium metal deposition unit is preferably 50 to 500 kPa.

Preferably, at least one of the first channel, the second channel, the venturi section and the titanium metal deposition unit include a graphite wall. More preferably, it may be designed that a part or entire of the graphite wall is heated through induction-heating.

Preferably, at least a part of the deposition substrate is at a temperature from 900 to 1400° C. The substrate is preferably made of titanium or a titanium alloy. The titanium or titanium alloy substrate not only contributes to efficient deposition of titanium metal since the substrate has the same or similar crystal structure to titanium, but also the substrate can be used as titanium together with the deposited titanium metal in some cases.

A process for producing titanium metal according to the present invention includes the steps of:

(a) heating and gasifying a first material selected from magnesium and titanium tetrachloride;

(b) heating and gasifying a second material selected from magnesium and titanium tetrachloride at a temperature of not lower than 1600° C.;

(c) causing the second material to flow in an entrance channel of a venturi section including the entrance channel, an exit channel, and a throat having a smaller cross-sectional area between the entrance channel and the exit channel, and supplying the first material to the throat, while controlling a temperature of the throat and the exit channel at not lower than 1600° C.;

(d) introducing the gaseous magnesium and the gaseous titanium tetrachloride merged in the step (c) into a titanium metal deposition space, wherein the titanium metal deposition space includes a deposition substrate for depositing the titanium metal at a temperature from 715 to 1500° C.;

(f) making titanium metal deposited and grown on the substrate; and (g) discharging the mixed gas after the step (f).

According to a preferred embodiment, the first material is magnesium and the second material is titanium tetrachloride, and the step (b) includes heating and gasifying titanium tetrachloride at a temperature of not lower than 1600° C. by plasma heating. Alternatively, the first material may be titanium tetrachloride and the second material may be magnesium.

According to the apparatus and the process for producing titanium metal, titanium can be directly produced by a gas-phase reaction after a mixed gas of titanium tetrachloride and magnesium is formed. Thus, highly purified titanium can be produced efficiently with a high productivity. Additionally, since titanium is deposited on the substrate, additional steps are not necessary for separating reaction by-products, such as magnesium chloride and unreacted magnesium.

A venturi structure is advantageous for uniform mixing of titanium tetrachloride and magnesium since no dead zone of fluid exists. Since one of gases is supplied from a throat of the venturi structure, effective mixing is achieved.

The above-described object and other objects, advantages, and features will be apparent from non-restrictive embodiments below with reference to accompanying drawings.

DESCRIPTION OF EMBODIMENTS

The invention discloses a novel apparatus and a process for producing titanium metal.

Figure 1:
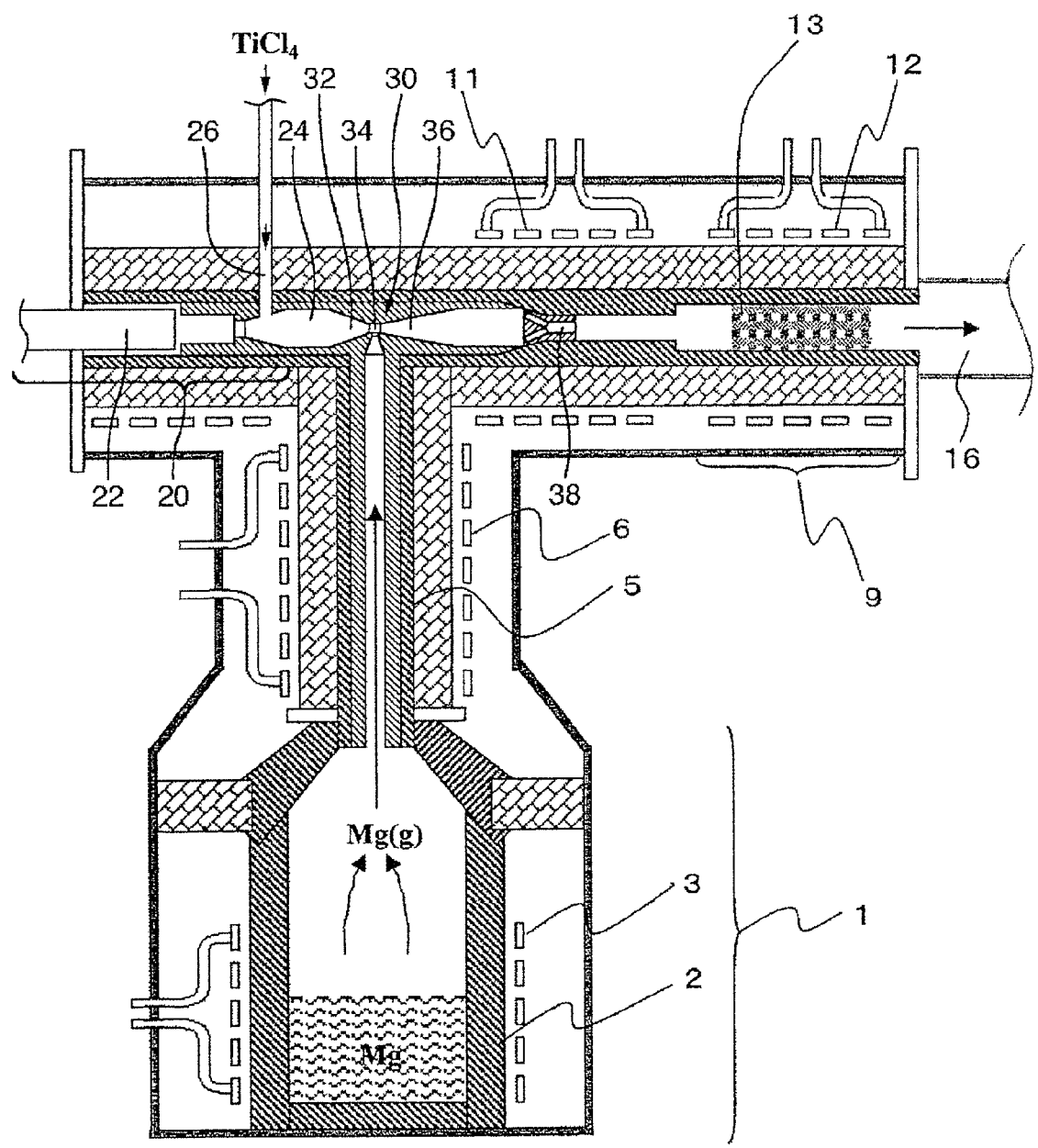
FIG. 1 is a schematic sectional side view of an example of the apparatus for producing titanium metal.

FIG. 1 shows a schematic sectional side view of an embodiment of the apparatus for producing titanium metal according to the invention. The apparatus includes: a magnesium heating unit 1 having a mechanism for heating and evaporating e.g. solid magnesium; a first channel 5 for supplying gaseous magnesium in communication with the heating unit; a titanium tetrachloride heating unit 20 for heating titanium tetrachloride into a gas having a temperature of not lower than 1600° C.; a second channel 24 for supplying gaseous titanium tetrachloride; a venturi section 30 connected to the second channel; a titanium metal deposition unit 9 in communication with the venturi section 30; and an exhaust unit 16 of a mixed gas in communication with the titanium metal deposition unit. The venturi section 30 has a shape that a middle portion is constricted. The smallest cross-sectional area portion is referred to as a throat 34, the upstream side (connected to the second channel 24) of the throat 34 is referred to as an entrance channel 32, and the downstream side (connected to the deposition unit 9) of the throat 34 is referred to as an exit channel 36. The first channel 5 is in communication with the throat 34 of the venturi section 30.

The heating unit 1 includes a crucible 2 in which magnesium is placed and a thermal source for evaporating the magnesium. As an example of the thermal source, FIG. 1 shows a heater 3 around at least a part of a side wall of the crucible 2. The heater raises a temperature in the crucible to an evaporating temperature of magnesium to evaporate the magnesium. Another example of the thermal source is to use a heater with a coil outside the crucible to induction-heat a graphite wall of the crucible. Induction-heating is an efficient and is advantageous in that magnesium is prevented from contamination while magnesium is evaporated, since magnesium does not contact the thermal source. Further another example of the thermal source is a DC plasma torch as a mechanism for evaporating magnesium.

The magnesium heating unit 1 is connected to a first channel 5 for supplying gaseous magnesium to the throat 34 of the venturi section. According to an embodiment of the invention, a heater 6 may be provided around at least a part of a side wall of the first channel 5. The heater raises a temperature in the channel to an evaporating temperature of magnesium so as to prevent magnesium from depositing in the channel. As an alternative embodiment, a heater with a coil may be provided outside the channel to induction-heat a graphite wall of the channel.

The apparatus is provided with a plasma torch 22 in the titanium tetrachloride heating unit 20 for heating and gasifying titanium tetrachloride at a temperature of not lower than 1600° C. A second channel 24 connects the titanium tetrachloride heating unit 20 with the entrance channel 32 of the venturi section. The titanium tetrachloride heating unit 20 includes the plasma torch 22 and a titanium tetrachloride supply section 26 for supplying titanium tetrachloride, e.g. in liquid, toward a plasma flame generated by the plasma torch. The plasma torch 22 is preferably directed toward the venturi section. A carrier gas heated by a plasma flame or a part of a plasma flame may flow to the venturi section 30 so as to maintain a temperature of a mixed gas at a temperature of not lower than 1600° C. even in the exit channel 36 of the venturi section 30. A carrier gas for plasma is not limited as far as it is an inert gas. For example, argon may be used.

According to an embodiment of the invention, a heater may be provided around at least a part of a side wall of the second channel 24 for supplying gaseous titanium tetrachloride and of the venturi section 30. The heater raises a temperature in the second channel and the venturi section 30 to a predetermined temperature. The second channel 24 and the venturi section 30 are preferably formed of a material having corrosion resistance against a chloride vapor. For example, the corrosion resistant material may be graphite. The second channel 24 and the venturi section 30 may be heated by induction-heating of a graphite wall of the second channel 24 and the venturi section 30.

One important feature of the invention is that a venturi structure is employed to mix gaseous magnesium and gaseous titanium tetrachloride. A venturi tube has a shape constricted in its middle. That is, a cross-sectional area is smaller in the middle of the tube, and the area becomes smoothly and gradually reduced toward the minimum as shown in FIG. 1. The portion having a small cross-sectional area is referred to as a throat. In FIG. 1, the smallest cross-sectional area portion is referred to as a throat. The venturi section 30 in FIG. 1 has a venturi structure, and has an entrance channel 32 upstream of the throat 34, which is in communication with the titanium tetrachloride heating unit 20, and an exit channel 36 downstream of the throat. The throat is in communication with the first channel 5 from the magnesium heating unit. Fluid flowing through the venturi tube is throttled at the throat and a flow rate increases. According to Bernoulli's theorem, a pressure of the fluid flowing through the venturi tube decreases as the flow rate increases. Consequently, a gas entering from the first channel which merges with the throat 34 is drawn in due to the pressure difference. This facilitates mixing of titanium tetrachloride gas and magnesium gas, and promoting formation of a uniform mixed gas. In this way, a uniform mixed gas of titanium tetrachloride and magnesium can be formed according to the present invention.

The gas entered at the throat 34 of the venturi tube passes through the exit channel 36 of the venturi tube, that is a region where the cross-sectional area of the venturi tube progressively increases, and then to the titanium metal deposition unit 9 following the exit channel, while mixing of the reactant gases proceeds. Forming a mixed gas by mixing gaseous titanium tetrachloride and gaseous magnesium can realize continuous and uniform reaction. A temperature of the throat 34 and the exit channel 36 should be maintained at not lower than 1600° C. Since a driving force for the reaction between titanium tetrachloride and magnesium is reduced as the temperature increases, the reaction can be substantially suppressed at not lower than 1600° C. As described below, the reaction should be suppressed in this region so that the reaction can be produced in the deposition unit 9 downstream of this region. If a plasma flame is directed toward the venturi section, for example, heat of the plasma flame directly enters the throat 34 and the exit channel 36, and thus the temperature of the throat 34 and the exit channel 36 can be controlled by controlling the heating of the plasma flame. Alternatively or additionally, a heating member 11 may be provided around the tube. As a heating member, it is preferable to provide graphite for induction-heating, while any other heating member may be used such as a heating wire.

As described above, a mixed gas as unreacted is introduced into the titanium metal deposition space 9. A passage leading to the titanium metal deposition space 9 may be provided with an orifice 38 therein. The mixed gas may be allowed to flow through the orifice 38 into the titanium metal deposition space 9, and the orifice 38 may be configured to direct the mixed gas flow to a deposition substrate 13 for depositing titanium metal.

The substrate 13 is arranged in the titanium metal deposition space 9, and at least a part of the substrate 13 is controlled in a temperature range from 715 to 1500° C. A driving force for the reaction of generating titanium is increased as the temperature of the mixed gas decreases. A surface of the substrate 13 arranged in the titanium metal deposition space 9 promotes heterogeneous nucleation and promotes generation and deposition of titanium.

A heater 12 is provided around at least a part of a side wall of the deposition unit 9 to raise a temperature in the titanium metal deposition unit to a predetermined temperature so as to control the substrate 13 at the above temperature. Inner wall of the titanium metal deposition unit 9 may be desirably made of a material having corrosion resistance against a chloride vapor. An example corrosion resistant material may be graphite. According to an alternative embodiment, temperature control can be achieved by a heater with a coil at the outside of the side wall of the titanium metal deposition unit to heat the wall by induction-heating.

An absolute pressure in the titanium metal deposition space 9 is preferably 50 to 500 kPa. The absolute pressure of 50 to 500 kPa is used as the following reasons. Regarding the upper limit, evaporation separation of magnesium and MgCl2 is advantageous as the titanium metal deposition space 9a has lower pressure. Even when the reaction occurs un-uniformly, by-products or intermediate compounds can be evaporated and separated since vacuum depressurization facilitates the evaporation.

Regarding the lower limit, treatment capability per unit reactor volume is generally increased with an increase of a reactor pressure. For example, when the pressure is increased by one order of magnitude, treatment capability is increased by one order of magnitude. In the invention, treatment capability can be remarkably improved since the pressure as described above can be applied, which has not been used hitherto.

Although titanium can be collected in principle even under a pressure of less than 50 kPa, production rate is reduced as the pressure decreases and possibility of air leakage into an apparatus is increased. Since titanium has high reactive activity with oxygen and nitrogen, it is required to protect the production process from outer air. As a degree of vacuum is increased, cost for preventing the air leakage of the apparatus during the process is increased. Under a pressure of not lower than 50 kPa, the air leakage can be easily prevented at an industrial production level. Thus, the pressure range of not lower than 50 kPa is preferable for practical use.

Although the treatment capability per unit reactor volume is increased as the pressure increases, evaporation efficiency of $MgCl_2$ is reduced. Thus, a higher pressure makes it difficult to produce highly purified titanium. Therefore, when the pressure exceeds 500 kPa, it becomes difficult to produce highly-purified titanium. In addition, production cost is increased to deal with high pressure in industrial equipment. Thus, the pressure of not greater than 500 kPa is effective.

In view of treatment capability, separation efficiency, and economic rationality of industrial equipment, a more preferable range of the absolute pressure is 90 to 200 kPa.

In the present invention, titanium can be deposited as particles on a surface of the substrate 13 in a temperature range of 715 to 1500° C. As the temperature is decreased, a driving force for producing the reaction is increased and evaporation efficiency of magnesium and $MgCl_2$ is reduced. On the contrary, as the temperature is increased, $MgCl_2$ and the like are efficiently evaporated and the driving force is reduced. At a temperature of higher than 1500° C., reduction reaction of titanium does not easily proceed. At a temperature of less than 715° C., homogeneous nucleation of reaction gas occurs and titanium is not easily deposited on the surface of the substrate. Accordingly, the temperature of at least a part of the substrate is preferably in a range of 715 to 1500° C.

The operation at a lower temperature is desirable since titanium deposition is stable at a lower temperature as well as in a view of a selection of structural material for the reaction vessel. However, reaction product, such as $MgCl_2$, is possibly mixed at a lower temperature. Accordingly, a temperature range is preferably 900 to 1400° C., more preferably 900 to 1300° C., and further preferably 900 to 1200° C. to realize stable industrial production.

A surface of the substrate provides a place for heterogeneous nucleation of titanium produced by the reaction and promotes its deposition. The substrate desirably has a shape that allows the mixed gas to pass through and contact the substrate uniformly. Therefore, it is desirable that the substrate includes a space therein and has a large surface area so that the mixed gas sufficiently flow therethrough. A porous structure is preferable to ensure a specific surface area of the substrate. It is also preferable that the substrate has a shape extending in a direction along the flow of the mixed gas flows and includes a channel of the mixed gas.

A mechanism for scraping the deposition substrate as the titanium metal deposit and grow may be provided n order to collect the deposited titanium metal continuously. Since the present inventors observed that a larger amount of titanium metal is deposited at a distal end (an end surface facing a flow of the mixed gas) of the substrate, the titanium deposited on the end surface can be continuously grown when the deposit is scraped away.

A scraper mechanism for scraping away the titanium on the surface of the substrate may be added, or a plurality of substrates sliding each other so as to scrape away the deposited titanium may be provided. Alternatively, vibration may be applied to the substrate to continuously collect the titanium particles on the surface of the substrate.

Furthermore, the substrate may be cooled in order to remove a reaction heat for controlling a temperature of the reacting area.

Material for the substrate 13 is not particularly limited. For example, ceramic or a metal may be used. Since the substrate is controlled at 715 to 1500° C., a refractory metal is preferable since it does not melt and change properties in the temperature range. For effective deposition, the material preferably has a crystalline structure similar to that of titanium. In particular, pure titanium or a titanium alloy is preferable as the material.

Pure titanium is particularly desirable for the substrate in order to maintain a degree of purity of collected titanium and prevent mixing of impurities.

Figure 2:
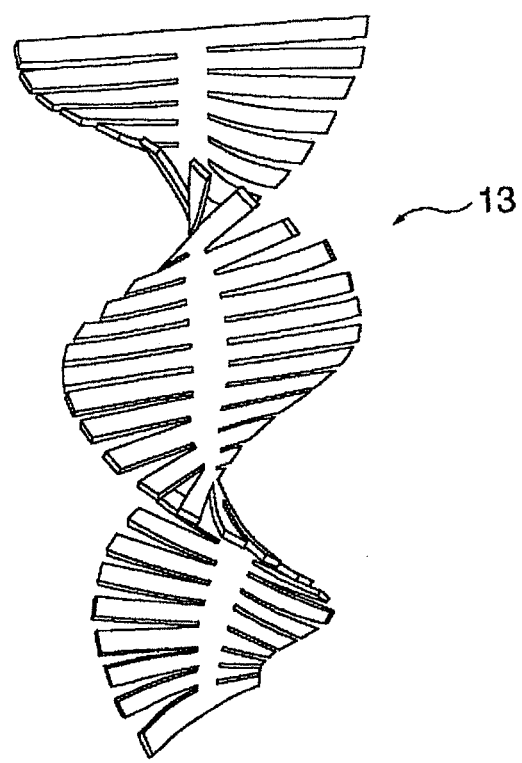
FIG. 2 is a schematic drawing of an example of the substrate for depositing titanium metal.
Figure 3:
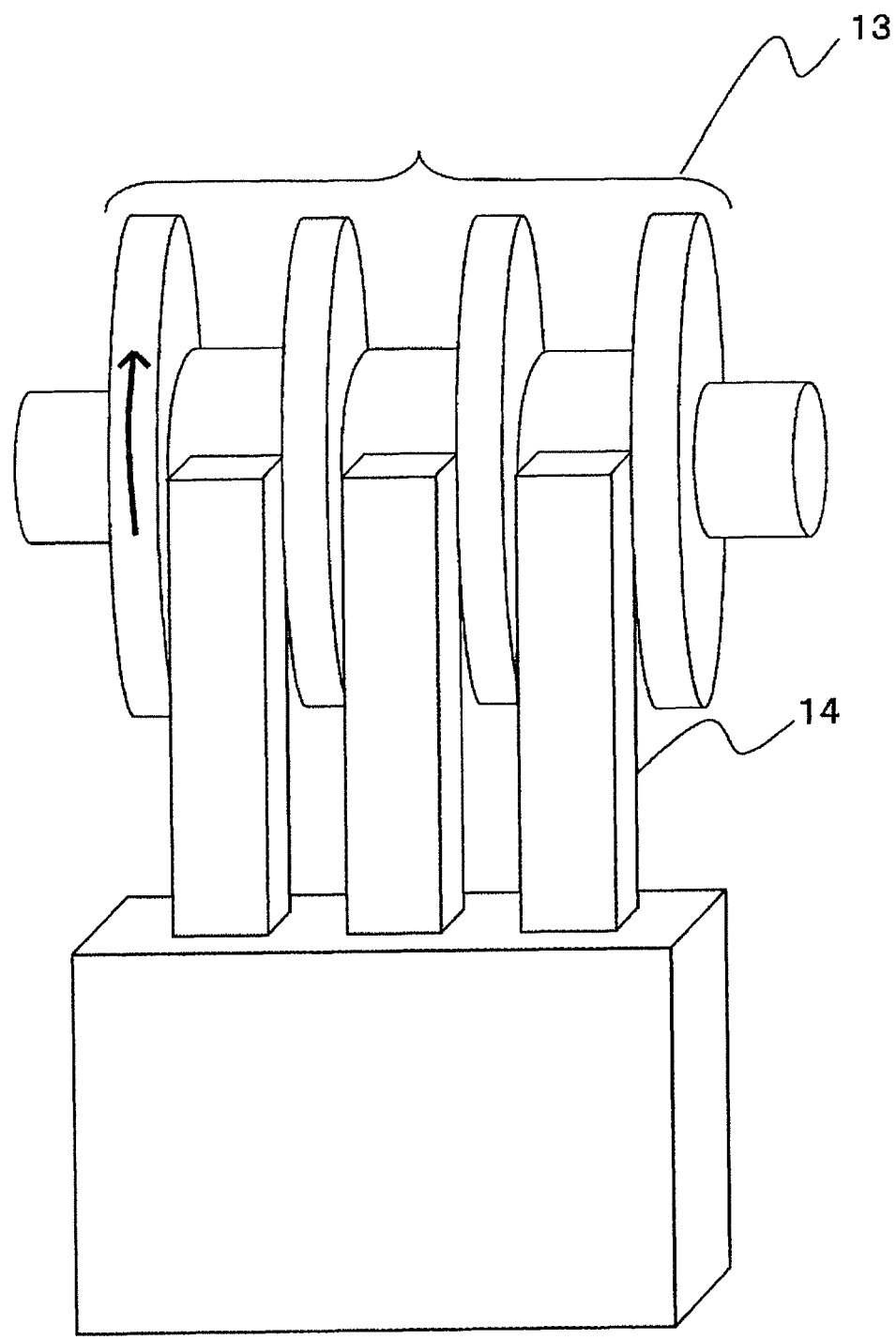
FIG. 3 is a schematic drawing of an example of the deposition substrate and a scraper.

FIGS. 2 and 3 show one embodiment of a mechanism for continuously collecting titanium metal deposited on the substrate. The substrate 13 in FIG. 2 has slits cut from right and left sides of a metal plate and twisted in a spiral about a center. This substrate 13 has a large surface area while a sufficient space for flowing of the mixed gas is secured. FIG. 3 shows a schematic drawing of a structure of a scraper. The substrate 13 may have a roll shape having raised and recessed sections of different diameters in a direction perpendicular to a rotation axis and is configured to rotate a central axis with a motor. It has a plurality of disk shaped metal plates connected together on the same central axis. Under the roll-shaped substrate 13, provided is a scraper 14 for scraping away titanium metal deposited on the surface of the substrate. Scraped titanium can be continuously collected by a collector (not shown) connected to the bottom of the titanium metal deposition unit. The substrate is not limited to that described above, and any substrate may be used.

The mixed gas of gaseous magnesium and gaseous titanium tetrachloride except for titanium deposited and grown in the titanium metal deposition unit is discharged through a discharge unit 16 connected to the deposition unit, and by-product of magnesium chloride is collected by a filter or the like.

Examples

The apparatus shown in FIG. 1 was used to produce titanium metal. Solid magnesium was placed in a crucible 2 in a magnesium heating unit 1. Magnesium was induction-heated by a heater 3 at a temperature at which magnesium can evaporate so as to obtain gaseous magnesium. In a titanium tetrachloride heating unit 20, liquid titanium tetrachloride was supplied from a supply section 26 into a plasma flame produced by a plasma torch 22. Titanium tetrachloride was gasified through plasma heating. Gaseous titanium tetrachloride was at a high temperature of not lower than 1600° C.

Next, gaseous titanium tetrachloride was passed through a second channel 24 to an entrance channel 32 of a venturi section 30 along with a carrier gas of argon. The gaseous magnesium was supplied to a throat 34 of the venturi section 30 through a first channel 5 heated by a heater 6 by induction-heating. This causes magnesium and titanium tetrachloride to merge in the throat 34 and to be mixed in the exit channel 36. During the procedure, a temperature of the throat 34 and the exit channel 36 was controlled between 1700 and 1750° C. throughout the process.

The mixed gas was then passed through an intermediate channel provided with an orifice 38 and induction-heated by a heater 11 and introduced into a titanium metal deposition unit 9 also induction-heated by a heater 12. The spiral-shaped deposition substrate 13 shown in FIG. 2 is placed in the titanium metal deposition unit 9. The substrate 13 was made of titanium, and its temperature was generally maintained between 1050 and 1200° C. even though it reached 1250° C. at a beginning of the operation. The pressure in the titanium metal deposition unit 9 could then be measured near a discharge unit 16 for the mixed gas that followed and was in communication with the titanium metal deposition unit 9, and was 105 kPa in absolute pressure.

Figure 4:
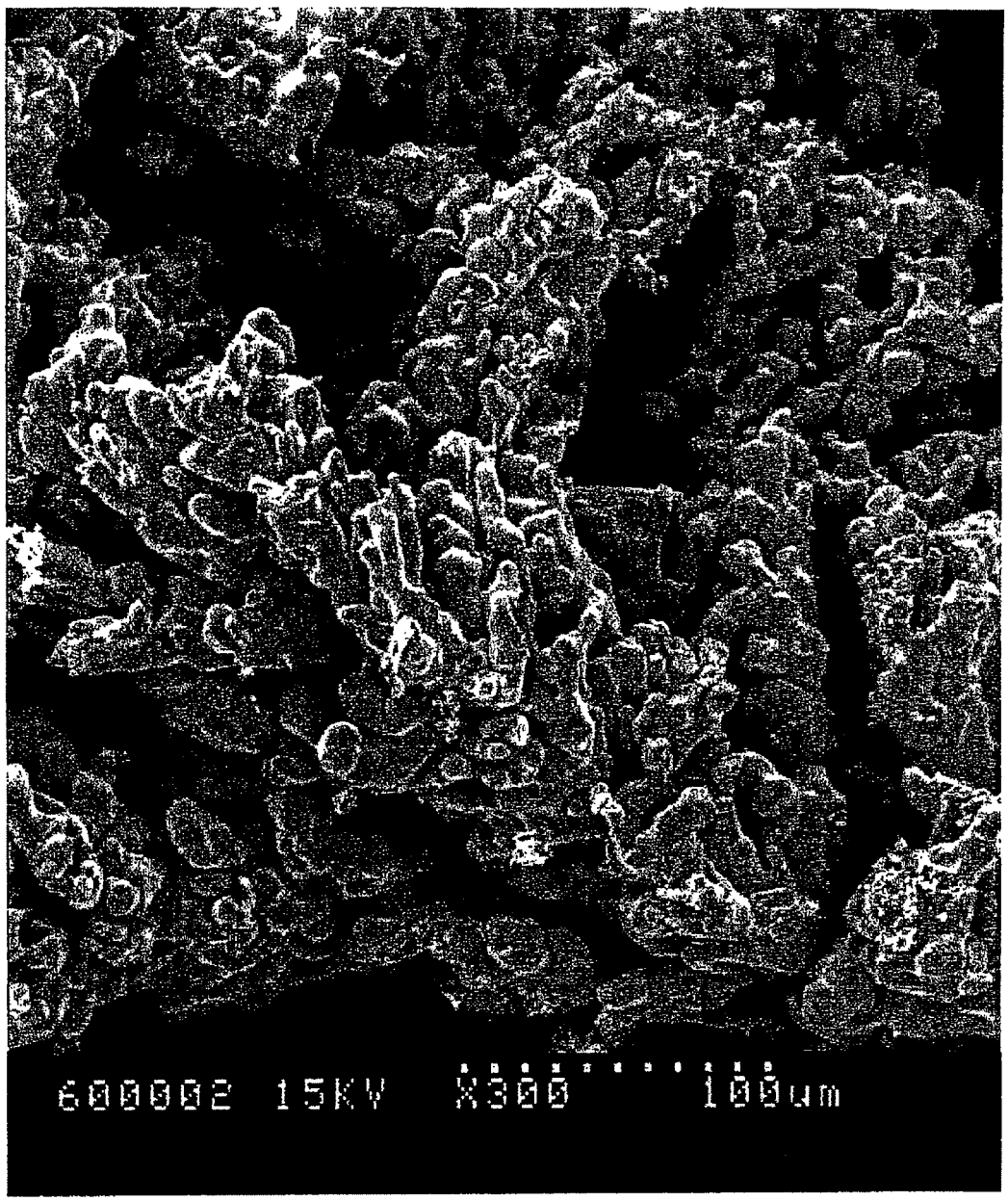
FIG. 4 is a scanning electron micrograph of a titanium metal obtained by the invention.

A scanning electron micrograph (×300 magnifications) of a substance recovered from a surface of the substrate 13 as a result of the operation described above is shown in FIG. 4. The recovered substance shows a state of the substance deposited and grown on the substrate 13. As a result of analysis, it was confirmed that the recovered substance was titanium metal.

The process according to the invention makes it possible to continuously produce titanium and the produced titanium metal is suitable for a material for melting or a powder metallurgy. The process can be also applied to the production of an ingot for electronic materials, aircraft parts, or power and chemical plants.

Embodiments of the process for producing titanium metal according to the invention are explained above. However, the invention is not limited thereto, and can be modified without departing from the spirit and scope of the present invention as defined in the appended claims.

REFERENCE SIGNS LIST 1 magnesium heating unit
2 crucible
3 heater
5 first channel
6 heater
9 titanium metal deposition unit
11, 12 heater
13 deposition substrate
14 scraper
16 discharge unit
20 titanium tetrachloride heating unit
22 plasma torch
24 second channel
26 titanium tetrachloride supply section
30 venturi section
32 entrance channel
34 throat
36 exit channel
38 orifice

The invention claimed is:

1. An apparatus for producing titanium metal comprising:
   (a) a first heating unit for heating and gasifying a first material selected from magnesium and titanium tetrachloride, and a first channel for supplying the gaseous first material from the first heating unit;
   (b) a second heating unit for heating and gasifying a second material selected from magnesium and titanium tetrachloride at a temperature of not lower than 1600° C., and a second channel for supplying the gaseous second material from the second heating unit;
   (c) a venturi section including an entrance channel, an exit channel, and a throat having a smaller cross-sectional area between the entrance channel and the exit channel, wherein the second channel is connected to the entrance channel and the first channel merges with the throat so that magnesium and titanium tetrachloride flowing through the first channel and the second channel merge in the throat and the merged gaseous magnesium and titanium tetrachloride are mixed in the exit channel, and wherein a temperature of the throat and the exit channel is controlled at not lower than 1600° C.;
   (d) a titanium metal deposition unit in communication with the exit channel, the titanium metal deposition unit having a deposition substrate for depositing the titanium metal at a temperature from 715 to 1500° C.; and
   (e) a discharge unit for discharging the mixed gas in communication with the titanium metal deposition unit;
   wherein the second material is different from the first material.

2. The apparatus according to claim 1, wherein the first material is magnesium and the second material is titanium tetrachloride, and the second heating unit includes a plasma torch and a titanium tetrachloride supply section, thereby titanium tetrachloride is supplied from the titanium tetrachloride supply section and injected into a plasma flame produced by the plasma torch and heated at not lower than 1600° C.

3. The apparatus according to claim 1, wherein the first material is titanium tetrachloride and the second material is magnesium, and the second heating unit includes a plasma torch and a magnesium supply section, thereby magnesium is supplied from the magnesium supply section and injected into a plasma flame produced by the plasma torch and heated at not lower than 1600° C.

4. The apparatus according to claim 1, wherein an absolute pressure in the titanium metal deposition unit is 50 to 500 kPa.

5. The apparatus according to claim 1, wherein at least one of the first channel, the second channel, the venturi section, and the titanium metal deposition unit comprises a graphite wall.

6. The apparatus according to claim 5, wherein a part or all of the graphite wall is heated by induction-heating.

7. The apparatus according to claim 1, wherein the substrate is at a temperature from 900 to 1400° C.

8. The apparatus according to claim 1, wherein the substrate is made of titanium or a titanium alloy.

9. A process for producing titanium metal, comprising steps of:
   (a) heating and gasifying a first material selected from magnesium and titanium tetrachloride;
   (b) heating and gasifying a second material selected from magnesium and titanium tetrachloride at a temperature of not lower than 1600° C.;
   (c) causing the second material to flow in an entrance channel of a venturi section including the entrance channel, an exit channel, and a throat having a smaller cross-sectional area between the entrance channel and the exit channel, and supplying the first material to the throat, while controlling a temperature of the throat and the exit channel at not lower than 1600° C.;
   (d) introducing a mixed gas of the gaseous magnesium and the gaseous titanium tetrachloride merged in the step (c) into a titanium metal deposition space, wherein the titanium metal deposition space includes a deposition substrate for depositing the titanium metal at a temperature from 715 to 1500° C.;
   (f) making titanium metal deposited and grown on the substrate; and
   (g) discharging the mixed gas after the step (f);
   wherein the second material is different from the first material.

10. The process according to claim 9, wherein the first material is magnesium and the second material is titanium tetrachloride, and step (b) includes gasifying titanium tetrachloride at a temperature of not lower than 1600° C. by plasma heating.

* * * * *